US006965870B1

(12) United States Patent
Petras et al.

(10) Patent No.: US 6,965,870 B1
(45) Date of Patent: Nov. 15, 2005

(54) METHOD AND SYSTEM FOR ACTIVITY RESPONSIVE TELEMARKETING

(75) Inventors: Michael William Petras, Nepean (CA); Alan Stuart Frank, Nepean (CA); Douglas Petty, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 08/997,990

(22) Filed: Dec. 24, 1997

(51) Int. Cl.[7] .............................................. G06F 17/60
(52) U.S. Cl. ...................... 705/14; 705/14; 709/217; 709/227; 709/203; 709/218; 379/201.1; 707/10
(58) Field of Search .......................................... 705/14

(56) References Cited

U.S. PATENT DOCUMENTS

| 5,390,243 | A | | 2/1995 | Casselman et al. ......... 379/265 |
|---|---|---|---|---|
| 5,506,898 | A | * | 4/1996 | Costantini et al. ..... 379/266.06 |
| 5,530,744 | A | | 6/1996 | Charalambous et al. .... 379/265 |
| 5,727,129 | A | * | 3/1998 | Barrett et al. ................... 395/12 |
| 5,793,861 | A | * | 8/1998 | Haigh ......................... 379/266 |
| 5,848,412 | A | * | 12/1998 | Rowland et al. ................ 707/9 |
| 5,884,032 | A | * | 3/1999 | Bateman et al. ........ 395/200.34 |
| 5,930,764 | A | * | 7/1999 | Melchione et al. ............ 705/10 |
| 6,014,647 | A | * | 1/2000 | Nizzari et al. ................. 705/39 |
| 6,052,730 | A | * | 4/2000 | Felciano et al. ............. 709/225 |
| 6,070,185 | A | * | 5/2000 | Anupam et al. ............. 709/204 |
| 6,385,646 | B1 | * | 5/2002 | Brown et al. ................ 709/217 |

FOREIGN PATENT DOCUMENTS

| WO | WO 97/23838 | 7/1997 | ........... G06F/17/60 |
|---|---|---|---|
| WO | WO 97/34246 | 9/1997 | ........... G06F/17/60 |

OTHER PUBLICATIONS

Focus on: telemarketing—an information business & database foundation., O. Reilly, Eamon, Telemarketing & Call Center Solutions, v14, n7, p70(4), Jan. 1996.*
Customer advacacy paradigm: the Bonnie button and beyond. Chiranky, Lisa, Telemarketing & Cell Center Solutions, v15, n7, p98(5), Jan., 1997.*
Star Wars comes to direct marketing, Foskett, Sally, Direct Marketing, v60 n1 pp: 62–63+, May 1997.*
The coming battle for customer information, Hagel, John III, Rayport, Jeffrey F., McKinsey Quarterly n3 pp: 64–76, 1997.*
Will the dream become a reality?, Anonymous, US Banker v107 n11 pp: S47–S53, Nov., 1997.*
Marketting service versus marketing efforts, Culepper, Kenneth M. Direct Marketing v59 n12 pp: 22–25, Apr. 1997.*
Blau Technologies, Inc., "Blau Marketing Technologies and IBM Form Technology Partnership to Jump Start Electronic Commerce" , Dec. 1996.*
AnswerSoft Inc., AnswerSoft announces Concerto; first to combine call center automation with power of Web, Feb. 3, 1997.*

(Continued)

*Primary Examiner*—Yehdega Retta
(74) *Attorney, Agent, or Firm*—Max R. Wood; Ogilvy Renault (57) ABSTRACT

A method of alerting a telemarketing agent of a promotion opportunity in response to activity of a potential customer browsing a public server and an apparatus for monitoring the customer activity and alerting the telemarketing agent includes a telemarketing analysis server, computer telephony hardware and a server for controlling the computer telephony hardware. The apparatus further includes software on the public server for collecting data relating to the activity of potential customers browsing the public server.

38 Claims, 7 Drawing Sheets

OTHER PUBLICATIONS

Internet & Call Center Solutions, Web Power: Taking Call Centers To New Dimensions, Lisa Chiranky, Answersoft, Inc., Jan. 1997.*

Mixing Web sites and Call centers: can this marriage really work? (World Wide Web), Chiranky, Lisa, Telemarketing & Call Center Solution, v15, n12, p34 (5), Jun. 1997.*

Direct approach, Dlackwood, Francy, San Francisco Business Times, v11, n18, pA6, Dec. 20, 1996.*

Dialing for dollars: Using call centers to keep your customers (satisfied), Electrical World, Nov. 1997; p. 29, vol. 211, No. 11.*

Call center software versus contact managers, Telemarketing & Call Center Solution; Norwalk; Mar. 1997; Bruce Adams.*

Avantel/versatility: Avantel chooses Versatility Software to automate telemarketing efforts in Mexico; M2 Presswire, Dec. 19, 1996.*

AT&T, Spanlink to provide secure Internet Links; Dec., 4, 1995, www.lucent.com/press/1295/951204.gba.*

A Quartet of products is introduced that link the Internet to Call Center; Telemarketing ® Technology Highlight; May 1996.*

Page Call Links Call centers, Web; Bank Systems & Technology; New York Apr. 1996; Sraeel, Holly.*

Page Call software puts web site visitors, administrators in touch; Computerworld; Framingham; Mar. 11, 1996; Wagner, Mitch.*

Edify to roll out interactive web–based application; Network World; Framingham Mar. 11, 1996; Cole, Barb.*

WebAssist as taught in reference "Call Centers: Sky Alland Marketing" Dec. 1, 1996; Bank Technology News.*

Web Marketers: Call–back to the future with POTS!, (working Draft Aug. 10, 1996); http://www.teleshuttle.com/media/webpots.*

Customer cyber–representatives; Bank Technology News; Dec. 1996; DeCovny, Sherree:.*

The case for Integrating 800 and Internet Call Centers; Telemedia News &Views, v4, n7; Jul. 1, 1996.*

Call routing solutions for virtual call centers. (call Centers) (includes related article on network providers) Tanner, Todd; Ingram Guy; Business Communications Reviews, 27 11, 36(5); Nov., 1997.*

Thom, G.A.: "H.323: The Multimedia Communications Standard for Local Area Networks" IEEE Communications Magazine, Dec. 1996.

Kristol, D. et al.: "HTTP State Management Mechanism", Netscape Communications, Feb. 1997.

* cited by examiner

*Hello, and welcome to our web site.*
*My name is Henry and I work here.*
*I'm here to help you if I may.*
*Please indicate your preference:*

- ○ Just browsing, thanks.
- ○ Let's have a text chat.
- ○ Let's have a web conference.
- ● Please call me at: _________

FIG. 6b

*Hi there! My name is Henry.*
*I've seen you several times.*
*I was just wondering if you need some help with anything.*
*Can we talk?*

- ○ No thanks, just browsing.
- ○ Let's have a web conference.
- ● Sure, call me at: _________

FIG. 6c

*Hello Mr. Jones, this is Henry.*
*How do you like your new printer?*
*Need any help today?*

- ○ No thanks, just browsing.
- ● Yes, call me

FIG. 6d

*Hi Dan. Hank.*
*We got in your laptop and its being shipped this afternoon.*
*You need any help today?*

- ● Just checking on the laptop.
- ○ Call me

Our site is open for your browsing pleasure be we have no sales staff on duty at this time of day. Our regular business hours are 8 am - ll pm every day. If you would like us to call during those hours, please indicate:

o No thanks, just browsing.
o Let's have a web conference.
● Sure, call me at:
    _ _ _ - _ _ _ - _ _ _ _ on
    Date: mm/dd/yy  Time:hh/mm

FIG. 6f

*Hello, my name is Henry. I'm your sales attendant. I just want to let you known that all of our printers are 20% off today. You can order by phone! If you like I can call you now.* o No thanks, just browsing.
o Let's have a web conference.
● Sure, call me at:
    _ _ _ - _ _ _ - _ _ _ _

FIG. 6e

| IP Address | Session Start | Last Access | Current Page |
|---|---|---|---|
|  |  |  |  |
|  |  |  |  |

FIG. 7

METHOD AND SYSTEM FOR ACTIVITY RESPONSIVE TELEMARKETING

RELATED APPLICATIONS

This application is related to U.S. Patent Application entitled METHOD AND APPARATUS FOR ORIGINATING VOICE CALLS FROM A DATA NETWORK filed Oct. 10, 1997 and assigned Ser. No. 08/948,975, the specification of which is incorporated herein by reference in its entirety.

TECHNICAL FIELD

The present invention relates generally to telemarketing and, in particular, to directed telemarketing in response to activity of a potential customer browsing a public server which may be accessed through a data network such as the World Wide Web (WWW).

BACKGROUND OF THE INVENTION

Telemarketing has matured to a significant industry in which a large number of companies compete for business. Today's telemarketing is based on a strategy of attempting to call qualified prospects at times when they are most likely to be at home. Lists of qualified prospects are often compiled from indirect sources that may poorly reflect past behaviour or may not accurately reflect current buying interests. Besides, qualified prospects are often not at home or are not interested in a sales pitch at the particular time they are called.

Consequently, much inventive ingenuity has been invested in making telemarketing systems more efficient to ensure that a maximum number of calls are handled in any given time period, in order to increase the number of sales opportunities. Such innovations include a system and method for out-dialling telephone calls on a basis which takes into account the availability of agents who are assigned to process telephone calls placed, as described in U.S. Pat. No. 5,553,133 which issued to Perkins on Sep. 3, 1996. The patent describes a system in which telephone calls are placed ahead of the availability of agents so that the overall productivity of the agents is increased. The number of telephone calls that should be placed is determined in light of the actual measurements of system performance and in light of performance objectives. Determinations are dynamically refined based on measurements of actual agent and telephone call activity provided by the telephone system.

While such innovations ensure that agent time is efficiently used, they do nothing to address the problem of targeting an audience that is interested in the product or service being marketed and available to respond to a call.

In recent years, the World Wide Web (WWW) has provided a constant presence for business which may be visited by potential customers. While the importance of the WWW has been increasingly accepted and tens of thousands of companies now have a presence on it, there is currently no provision to permit those companies to participate in the process of closing a sale. In its current form, the WWW does not support spontaneous behaviour that characterizes impulse buying.

Although recent innovations have provided mechanisms to permit interested individuals to contact company representatives using call request buttons, such as described in applicants' copending patent application described above, such mechanisms are passive and may be ignored by potential customers who would otherwise respond to a more immediate and personal contact.

There therefore exists a need for a method of telemarketing which is responsive to the specific activity of potential customers in order to ensure that effective contact with interested parties having focused attention is achieved.

SUMMARY OF THE INVENTION

It is an object of the invention to provide a method and a system for alerting a telemarketing agent of a promotion opportunity in response to activity of a potential customer browsing a public server.

It is a further object of the invention to provide a method and a system for automatically contacting a potential customer in response to activity of the potential customer browsing a public server and alerting a telemarketing agent of a promotion opportunity if the potential customer expresses an interest in communicating with a telemarketing agent.

It is yet a further object of the invention to provide a system for alerting a telemarketing agent of a promotion opportunity, wherein a call is automatically placed to the potential customer when an agent to which an alert message has been sent initiates a call process, the number for placing the call being retrieved automatically from a data terminal of the agent.

It is yet a further object of the invention to provide a method of determining when a telemarketing agent should be alerted to a promotion opportunity by examining the contents of a cookie received from a potential customer's browser.

It is yet a further object of the invention to provide a method of determining when a telemarketing agent should be alerted to a promotion opportunity, wherein if the potential customer refuses cookies, a session information table is maintained respecting the potential customer's session with the public server to determine whether some aspect of the session satisfies a predetermined criteria and the agent is sent an alert if the predetermined criteria is satisfied.

It is yet a further object of the invention to provide a method and an apparatus for automatically compiling a list of potential customers representing promotion opportunities when an agent is not available to receive a promotion opportunity alert in real time.

In accordance with the invention, there is therefore provided a method of alerting a telemarketing agent of a promotion opportunity in response to activity of a potential customer browsing a public server, comprising:
  monitoring the public server to determine if past or present activity of the potential customer satisfies a predefined criteria; and
  sending a message to the telemarketing agent to advise the telemarketing agent of the promotion opportunity when the activity of the potential customer satisfies the predetermined criteria, the message including means for identifying the potential customer to permit the telemarketing agent to communicate with the potential customer.

In accordance with a further aspect of the invention, there is provided a method of alerting a telemarketing agent of a promotion opportunity in response to a potential customer browsing a public server, comprising:
  monitoring the public server to determine if past or present activity of the potential customer satisfies a predefined criteria;

sending a message to the potential customer when the activity of the potential customer satisfies the predefined criteria, the message permitting the potential customer to indicate a preference respecting communications with the telemarketing agent; and advising the telemarketing agent when the potential customer indicates a preference to communicate with the telemarketing agent.

The invention further provides a system for alerting a telemarketing agent of a promotion opportunity in response to activity of a potential customer browsing a public server, comprising:

monitoring means for monitoring the activity of potential customers visiting at least one public server to access information;

activity analysis means for determining when the activity satisfies a predefined criteria; and alerting means for alerting the telemarketing agent when the activity analysis means determines that the activity of a potential customer satisfies the predefined criteria.

The invention therefore provides a method and a system of alerting a telemarketing agent of a promotion opportunity in response to activity of a potential customer browsing a public server. For the purposes of this document, the term public server means any server which may be accessed by a person other than the creator of the site supported by the server.

In accordance with the method, software which runs actively on the public server monitors the activity of individuals accessing the public server to determine whether the individual may qualify as a potential customer. If the activity of the individual indicates a potential customer, a message is sent to a telemarketing agent having access to a switched telephone network and to a data network through which messages are sent. On receipt of a message, the telemarketing agent preferably responds by dispatching an invitation to initiate contact to provide the potential customer with information and/or effect a sale. The invitation may be a text message and associated form to permit the customer to respond with an indication of the type of contact they would prefer. The invitation may also be a multimedia message from the agent, or the like, if sufficient bandwidth is available.

The sending to a potential customer of an invitation to initiate contact may also be an automated process in which the invitation is sent before a telemarketing agent is advised of the presence of the potential customer at the public server. Potential customers who accept an invitation may be added to an agent call queue, from which agents select calls to be completed. If this option is used, the agent's workstation preferably runs a dedicated application which displays the call queue, current call status, call control options, etc.

The method and system in accordance with the invention permits agents to concurrently serve a plurality of public servers. It also obviates any requirement for a centralized call centre with automatic call distributors, etc. Agents may work from home, or be strategically positioned in small or large groups where economical or convenient. The system and method in accordance with the invention may also be used to accumulate potential customer contact lists at times when no agents are on duty. In order to accomplish this, the monitoring means is enabled to display a pop-up window which requests, for example, potential customers for a contact date, time and number at times when all agents are busy or none are available. This information can be stored and made available to agents when they come on duty so that calls are scheduled accordingly.

The methods and system in accordance with the invention also permits businesses to have a personal presence at a WWW site in much the same way as retail outlets maintain sales attendants in their stores. If the system is used in this way, the monitoring means for monitoring the activity of potential customers visiting the public server may be set so that an agent is advised as soon as someone accesses the WWW site, or after they have moved from the home page to any other page on the public server. Other criteria for alerts may also be used. In this mode of operation, the public server projects the "feel" of a well attended retail store and potential and/or repeat customers may receive personal attention.

The invention thereby provides a method and system of facilitating telemarketing to ensure efficient utilization of agents and guarantee that agents are contacting interested, focused potential and repeat customers rather than random or near random canvassing of the public at large.

BRIEF DESCRIPTION OF THE DRAWINGS

The invention will now be further explained by way of example only and with reference to the following drawings wherein.

DETAILED DESCRIPTION OF THE PREFERRED EMBODIMENT

This invention relates to a method and a system of alerting a telemarketing agent of a promotion opportunity in response to activity of a potential customer browsing a public server. The method involves the steps of monitoring the public server to determine if the activity of the potential customer at the public server satisfies a predefined criteria and sending an alert message to the telemarketing agent to advise the telemarketing agent of the promotion opportunity when the activity of the potential customer satisfies the predetermined criteria. The system in accordance with the invention includes software for monitoring the activity of a potential customer visiting at least one public server to access information, software for determining when the activity satisfies a predefined criteria, and software for alerting a telemarketing agent when the activity of a potential customer satisfies the predefined criteria.

Figure 1:
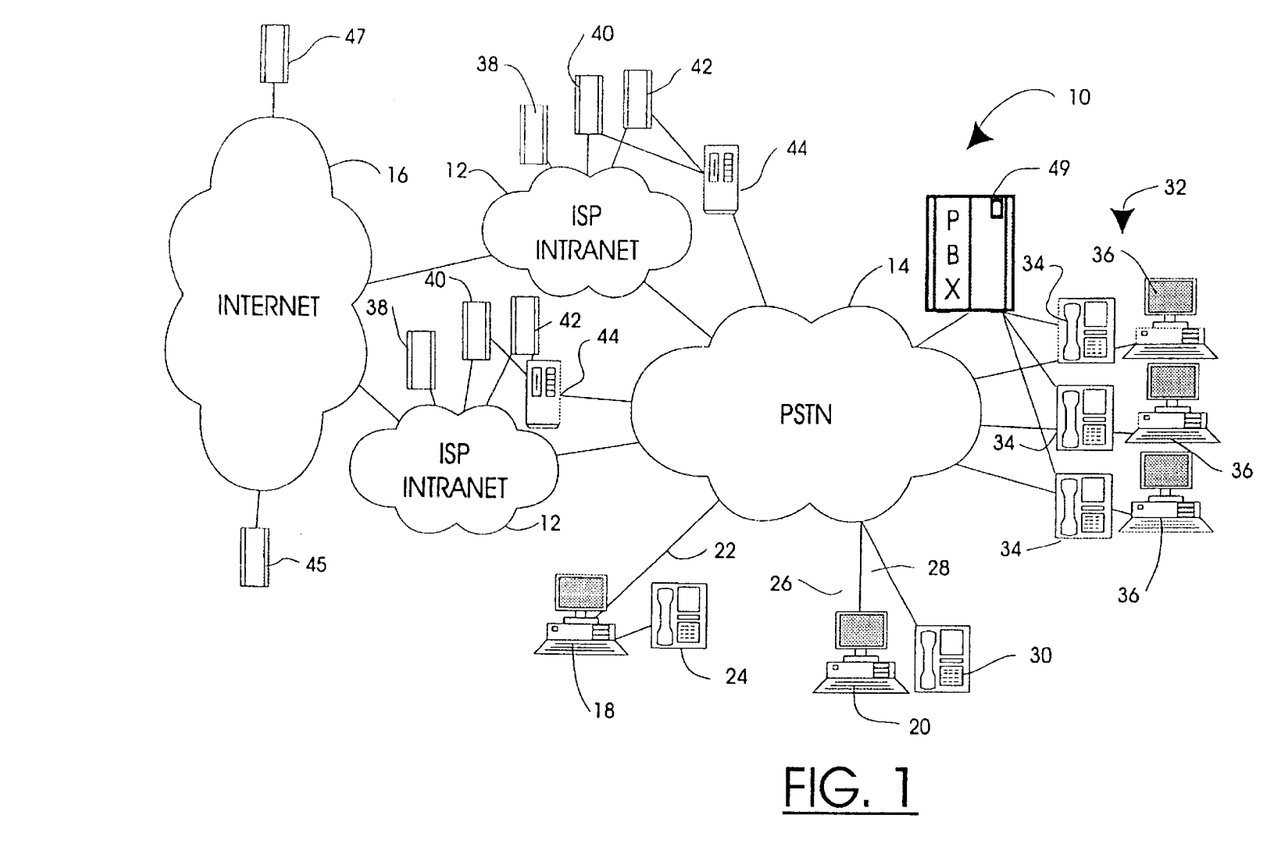
FIG. 1 is a schematic diagram of the components of a telemarketing system in accordance with the invention, showing their relationship with the Public Switched Telephone Network (PSTN) and the Internet.

FIG. 1 shows a schematic diagram of one potential configuration of a system in accordance with the invention, generally indicated by reference 10. It is assumed that the system in accordance with the invention will generally be offered as a service to a business by service providers such as Internet Service Providers (ISPs). The system in accordance with the invention may also be owned and operated by a telemarketing agency, a corporation or any other organization. It will be understood by those skilled in the art that one need not be an ISP to make, use or sell a system in accordance with the invention. The description which follows assumes, for the sake of example, that this service is provided by an ISP.

As shown in FIG. 1, each ISP has an Intranet 12 which is connected to the Public Switched Telephone Network (PSTN) 14 in a manner well known in the art, and to the Internet 16 also in a manner well known in the art. Connected to the PSTN 14 are a plurality of subscribers. Many of the subscribers access the Internet 16 by way of an ISP using a dial-up connection to the PSTN 14. Access to the Internet 16 through the PSTN is generally accomplished using Personal Computers (PCs) such as a subscriber PC 18 which is connected to the PSTN 14 by a telephone line 22. In the case of that subscriber, only one telephone line 22 is available which is used for the PC 18 and the telephone 24 of the subscriber. Other subscribers may have two lines available such as dataline 26 which connects PC 20 to the PSTN 14 and a telephone line 28 which connects telephone 30 to the PSTN 14. Also connected to the PSTN 14 is a telemarketer which uses the system in accordance with the invention, generally indicated by reference 32. In this example, the telemarketer 32 has a plurality of agents which are furnished with telephones 34 and PCs 36. The telephones 34 are respectively connected to a PBX 49, which is in turn connected to PSTN 14 by a trunk group such as an ISDN trunk group, in a manner well known in the art. It should be understood that the telemarketer 32 need not operate a PBX 49 with agents geographically co-located. The telemarketing agents may be geographically dispersed. They may be located, for example, in a home or a place of business and may have a Plain Old Telephone Service (POTS) connection to the PSTN, although in accordance with one preferred embodiment of the invention they are preferably connected to a PSTN switching node that supports a warm-line or hot-line service, as will be discussed below.

The system in accordance with the invention typically includes a telemarketing analysis server (TMA) 38 for analyzing customer activity and sending alert applets to telemarketing agents, a Computer Telephony Integration (CTI) server 40 for controlling CTI hardware 44 adapted to receive and to place calls. The system may also include a Voice over Internet Protocol (VoIP) gateway 42 which permits VoIP sessions to be conducted with potential customers such as a customer having PC 18 connected to the PSTN 14 by a single telephone line 22, as will be explained below in more detail. The system in accordance with the invention monitors access activity on one or more public servers 45, 47 connected to a data network such as the World Wide Web (WWW). The public servers 45, 47 may be connected to an ISP Intranet 12 or they may be connected with the Internet 16 in other ways well known in the art.

Figure 2:
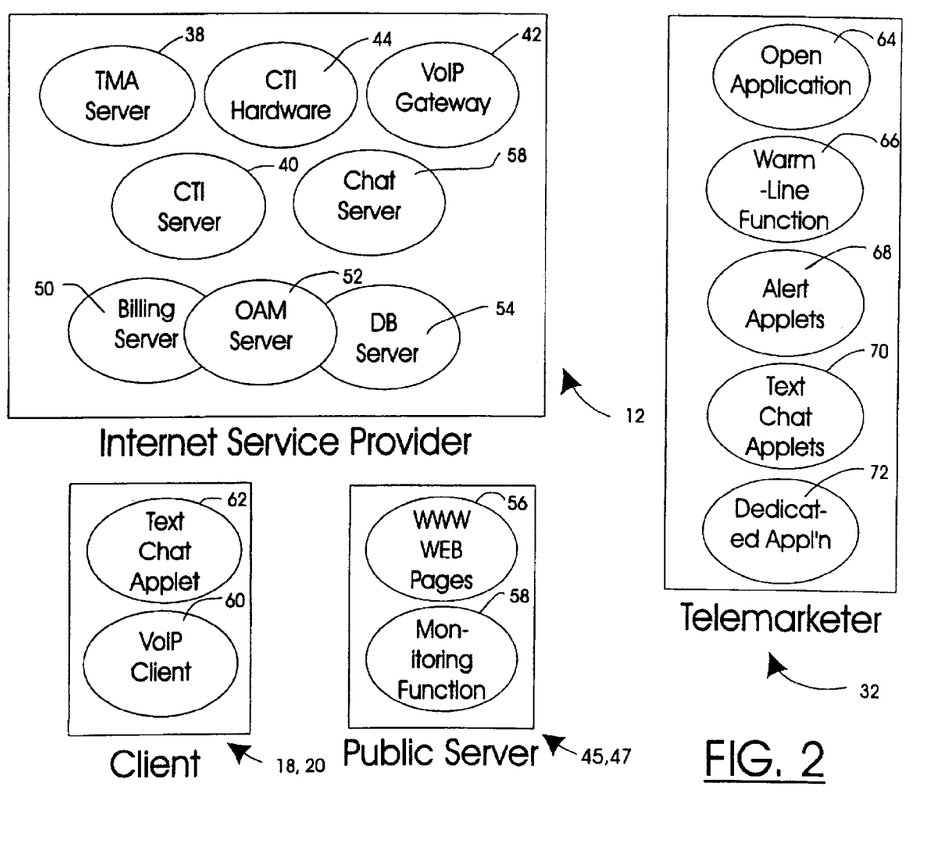
FIG. 2 is a schematic diagram of the principal components of the system in accordance with the invention.

FIG. 2 is a block diagram showing the principal components of the system in accordance with the invention. As described above, the Internet Service Provider (ISP) typically maintains servers for performing the principal functions of the system in accordance with the invention. For example, the ISP may maintain a telemarketing analysis server 38 for receiving data related to the browsing behaviour of potential customers from the public servers 45, 47 and analyzing that data to determine when an alert should be sent to a telemarketer 32. The ISP 12 also maintains a CTI server 40 for controlling CTI hardware 44 conveniently used to connect calls between the telemarketer and potential customers. As will be understood by those skilled in the art, calls to potential customers need not necessarily be made through or controlled by CTI hardware 44 and the CTI server 40 although they may be used to facilitate calling, as will be explained below in more detail.

ISP 12 will typically maintain an Operations and Maintenance Server 52 which may include a billing server 50 for monitoring telemarketing activity and issuing bills in a manner well known in the art. The OAM server 52 will likewise typically include a Data Base (DB) server 54 used for tracking telemarketing firms, their agents, service preferences, etc. The ISP 12 may also maintain a chat server 58 to permit text chat sessions to be established between a telemarketer 32 and a client 18, 20 of a potential customer in a manner well known in the art.

The telemarketer 32 has PCs 36 which are preferably equipped with a plurality of functions. When the PC 36 is operational, it has an active application 64 which is recognized by the operating system of the PC 36 to be the active application of the moment. The active application 64 may be used to supply data to a warm-line function 66 as will be explained below. The warm-line function 66 facilitates calling if the Internet Service Provider maintains a CTI server 40 and CTI hardware 44 in accordance with the invention. The PC 36 may receive alert applets, typically Java applets embedded in web pages which permit the telemarketer 32 to receive promotional opportunity alerts issued by telemarketing analysis server 38. Alternatively, PC 36 may run a dedicated application for the same purpose. The telemarketer 32 may also have a PC 36 that is equipped with a dedicated application 72 for displaying a call queue and permitting the telemarketing agent to respond to and control calls to potential customers, as will be explained below with reference to FIGS. 4 and 5.

The public servers 45, 47 are equipped with WWW pages 56 which provide information of interest to potential customers, including sales and/or promotional material. The public servers 45, 47 also include a monitoring function 58. The monitoring function is constantly active on the public servers 45, 47. The monitoring function is enabled to create and update "cookies" which are small data files used to track the activities of potential customers. The cookies can be used to store characteristics of user behaviour such as a previous purchase, the number of repeat visits, the time spent browsing the site, or other aspects of a customer's present or past behaviour. Cookies and their uses are well known in the art and will not be described here except to note that cookies used by the system in accordance with the invention are preferably encrypted to preserve privacy, etc.

Not all potential customers accept cookies from public servers such as public servers 45, 47. The monitoring function 58 is therefore also preferably equipped to monitor session information for those individuals who refuse cookies, as will be explained below with reference to FIG. 5.

Figure 3:
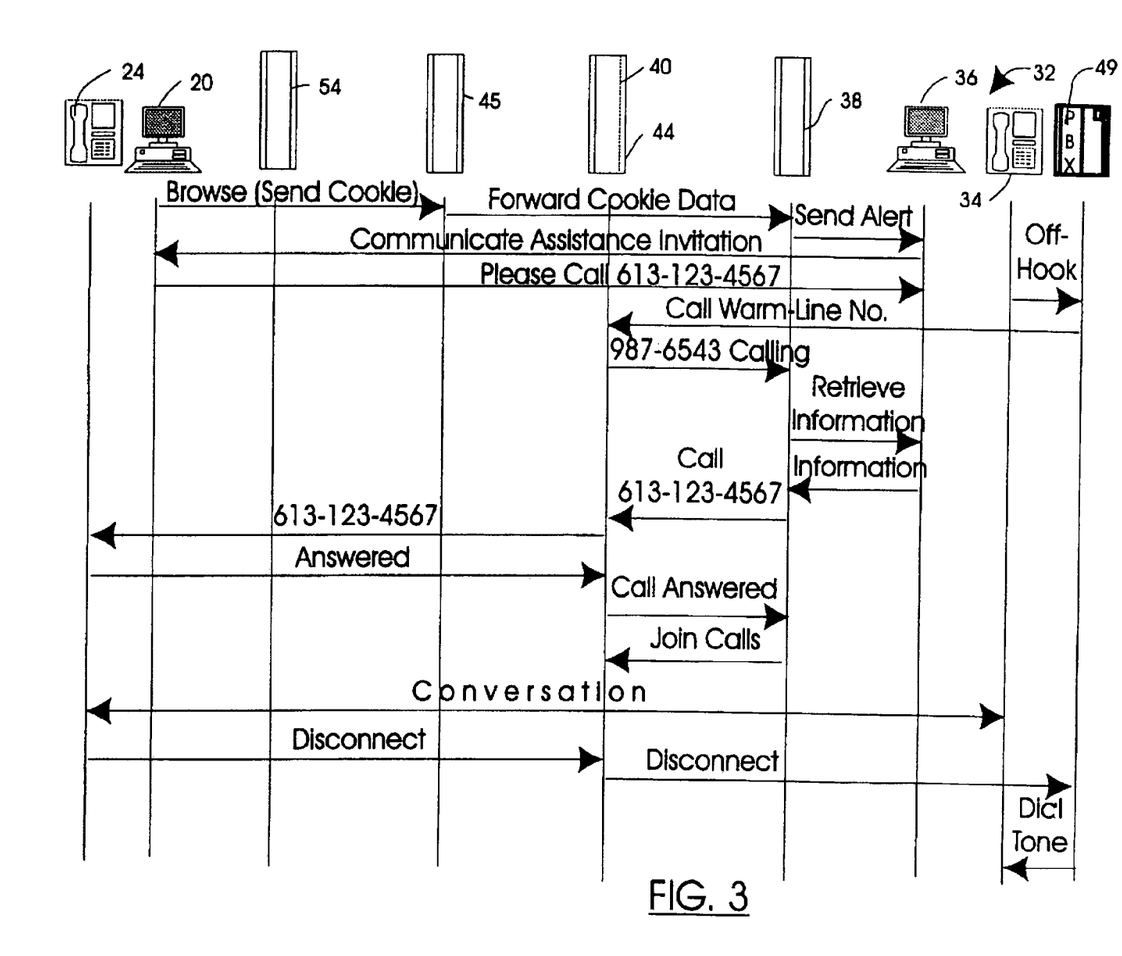
FIG. 3 is a schematic diagram of an exemplary call flow using the system in accordance with the invention.

FIG. 3 shows an exemplary call sequence enabled by the system in accordance with the invention. The call sequence shown in FIG. 3 is exemplary only and is only one of a substantially infinite number of variations enabled by the system in accordance with the invention. In the call sequence shown in FIG. 3, a potential customer accesses the public server 45 using PC 20. The potential customer's Internet browser forwards a cookie which was previously created by the public server 45 and stored on a hard disk of the PC 20 earlier in the present session or during a prior session. On receipt of the cookie, the monitoring function 58 (see FIG. 2) of the public server 45 extracts the cookie data and forwards the cookie data to the telemarketing analysis server 38 which analyzes the cookie data and determines that the potential customer using the PC 20 has, for example, visited the public server 45 twice in the last two days.

An activity analysis function on the telemarketing analysis server 38 is configured to determine that an alert should be sent to a telemarketing agent's PC 36 when a potential customer visits the public server 45 twice in one week. On determining that the potential customer using PC 20 meets a predefined criteria respecting activity of the potential customer, the telemarketing analysis server 38 prepares an alert message which it forwards over the Internet to the telemarketer's PC 36. The alert message is displayed as a "screen pop" or is added to a queue on the telemarketer's PC 36. On receipt of the alert message, the telemarketer responds with an assistance invitation to the potential customer 20. The assistance invitation may be, for example, a pop-up text window having prepared text and a form which permits the potential customer to respond with a preference as to how they would like to be served by the telemarketer 32. Other means, such as recorded voice and/or live video of the telemarketing agent 32 could be used providing that bandwidth, etc. permitted.

It is assumed that most installations of the system in accordance with the invention will use assistance invitations in text format such as will be described below with reference to FIGS. 6a–6f. Such messaging can be accomplished using Java applets, an "http push" of a URL specified by the telemarketing agent, or a command sent by the telemarketing agent to the public server 45, 47 to control the next page displayed when a potential customer moves to a next page on the public server 45, 47.

In this example, on receipt of the assistance invitation, the potential customer at PC 20 decides that he would like to speak to a telemarketing agent and responds with a request that the agent please call at the number of his telephone 24. On receiving the call request, telemarketer 32 selects a line for the telephone 34 which sends an off-hook signal to the PBX 49. In this example, the telemarketer is using a warm-line feature as described in applicant's copending patent application entitled METHOD AND APPARATUS FOR CALL COMPLETION USING INFORMATION RETRIEVED FROM AN OPEN APPLICATION ON A COMPUTING MACHINE, filed concurrently herewith, the specification of which is incorporated by reference herein in its entirety.

Using the warm-line feature, the telemarketing agent 32 selects the line but does not dial digits. The PBX 49 is programmed in a manner well known in the art to dial a predefined number if no digits are dialled within a predetermined period of time, say 2–5seconds. The PBX therefore dials the warm-line number which connects the PBX to the CTI hardware 44 of the CTI server 40. On receipt of the call, the CTI server 40, extracts the calling number from Automatic Number Identification (ANI) signaling information, for example, and advises the telemarketing analysis server 38 that it has received a call from the telemarketing agent. Telemarketing analysis server 38 checks a table of authenticated, on-line agents to determine whether the call was originated by a valid telemarketing agent, and, if so, to obtain a current IP address for the agent.

Since IP addresses are typically dynamically assigned on log on to an ISP, the IP address of the PC 36 was stored in the table at the beginning of the session initiated by the telemarketing agent 32. This may be accomplished in a number of ways. For example, the web browser may have its home page set to the telemarketing analysis server 38. Therefore, when a telemarketing agent opens the web browser at the beginning of a work shift, for example, the web browser opens the home page on the telemarketing analysis server 38. Simultaneously, a cookie is passed by the web browser from the telemarketer's PC 36 to the telemarketing analysis server 38. The cookie identifies the telemarketing agent and permits the server to capture the current IP address of the PC 36. The agent is thereafter free to work with the PC 36 as they wish. Alternatively, a session registration process could be used for the same purpose. In the session registration process, the telemarketing agent logs on to the telemarketing analysis server 38 using a User ID and a password in a manner well known in the art.

With reference again to FIG. 4, the telemarketing analysis server 38 formulates a warm-line message which it forwards to the telemarketer's PC 36 over the Internet. The telemarketer's PC 36 receives the message transparently. The message is received by the warm-line function 66 (FIG. 2) which is active on the telemarketer's PC 36. The message requests that the warm-line function 66 find an open warmline enabled application and request that the warm-line enabled application retrieve information from a current page, the information being a telephone number or some data which may be used as an index to find a telephone number. The warm-line enabled application searches its current page and retrieves the information. If there is ambiguity about the information, the warm-line enabled application may request that the telemarketing agent select the correct information from a displayed list, as is explained fully in applicant's copending application filed concurrently herewith.

Figure 4:
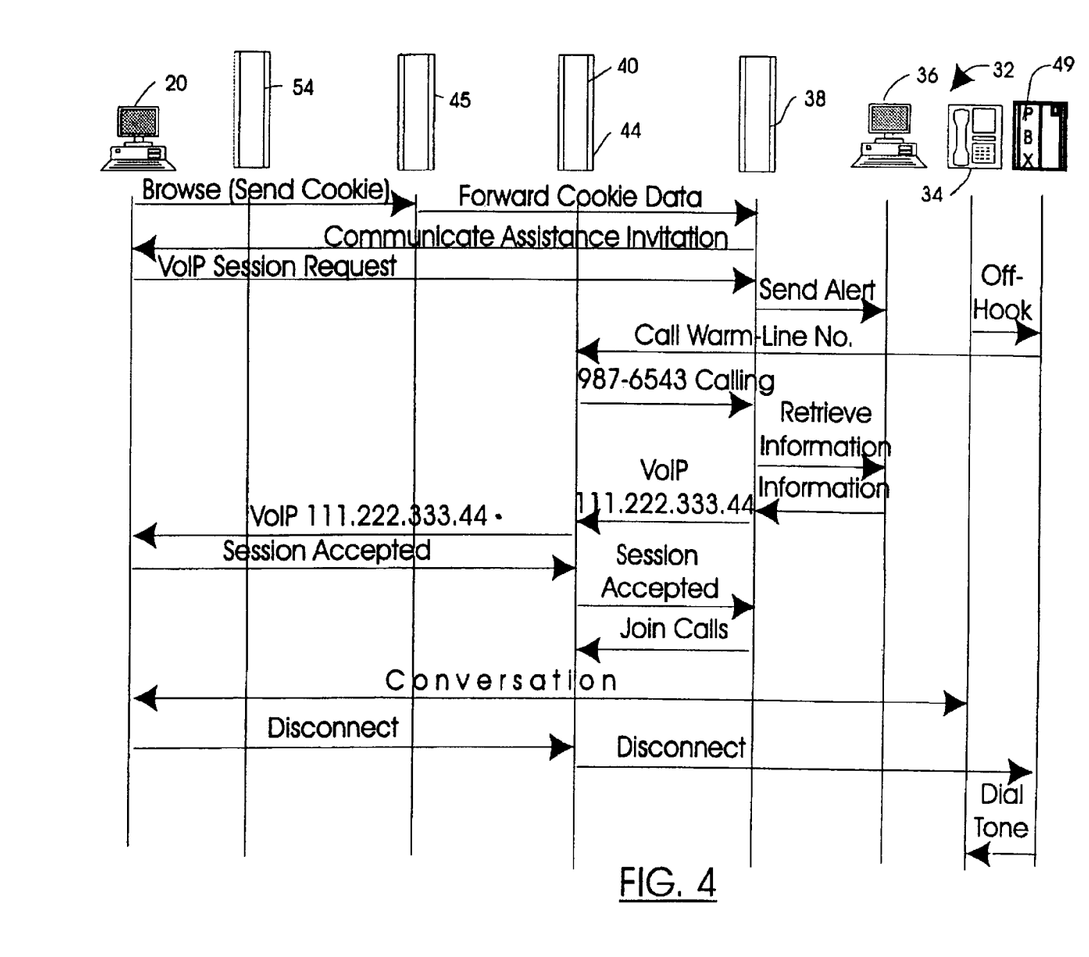
FIG. 4 is a schematic diagram of an exemplary call flow using a different implementation of the system in accordance with the invention, in which potential customers are presented with an invitation for personal contact before a telemarketing agent is advised of their presence at a WWW site.

The information retrieved by the warm-line enabled application is passed to the warm-line function 66 which returns it in a message sent over the Internet to the telemarketing analysis server 38. In this example, the message contains the phone number 613-123-4567 which the telemarketing analysis server 38 passes to the CTI server 40. The CTI server 40 instructs the CTI hardware 44 to dial the number. On dialling the number, the potential customer, expecting the call, answers telephone 24. The CTI server 40 advises the telemarketing analysis server 38 that the call has been answered and the telemarketing analysis server 38 instructs the CTI server 40 to join the two calls which permits a telemarketing agent using telephone 32 to speak with the potential customer using telephone 24. The telemarketing analysis server 38 may, of course, pass the URL of the page which the potential customer is viewing on the public server 45 to permit the telemarketing agent to be cognizant of the interest of the potential customer. The telemarketing analysis server 38 may also pass cookie data to the telemarketing agent to inform the agent of the customer's past behaviour, for example a previous purchase. After the conversation has terminated, the potential customer 24 may, for example, disconnect and the CTI server 40 responds by sending a disconnect to the PBX 49 which in turn applies dial tone to the telemarketing agent telephone 34. It will be understood by those skilled in the art that the disconnect may be initiated at telephone 34 by the telemarketing agent as well.

As noted above, other call sequences are enabled by the system in accordance with the invention. For example, if the potential customer with a single telephone line 22 (see FIG. 1) were to be contacted, it is likely that the potential customer would prefer to communicate with the telemarketing agent using a VoIP connection from the CTI server 40. In that case, the agent can still use telephone 34 to ensure better transmission quality and to free up his PC 36 for other functions such as receiving alert messages, etc. It should also be understood that it is not necessary to use the warm-line feature and that the agent may dial calls manually or use a voice dialling application to initiate calls to potential customers. It should also be understood that call requests received from potential customers can be used to generate calls automatically to free agents or agents predicted to be free by about the time the call is completed. The automatic generation of calls can save telemarketing agent time and enhance productivity.

FIG. 4 shows an exemplary call sequence enabled by a different implementation of the system in accordance with the invention. The call sequence shown in FIG. 4 is exemplary only and is only one other of the substantially infinite number of variations enabled by the system in accordance with the invention. In the call sequence shown in FIG. 4, a potential customer accesses the public server 45 using PC 20. The potential customer's Internet browser forwards a cookie which was previously created by the public server 45 and stored on a hard disk of the PC 20 earlier in the present session or during the prior session. On receipt of the cookie, the monitoring function 58 (see FIG. 2) of the public server 45 extracts the cookie data and forwards the cookie data to the telemarketing analysis server 38 which analyzes the cookie data and determines if the potential customer using the PC 20 has exhibited behaviour which meets a predefined criteria.

In accordance with this embodiment of the invention, when the telemarketing analysis server 38 determines that the customer has exhibited behaviour which meets a predefined criteria, the telemarketing analysis server 38 sends a message to the PC 20 using one of the mechanisms described above, which displays a window on the PC 20 inviting the potential customer to request personal contact with a telemarketing agent. This embodiment of the invention is particularly useful for WWW sites which receive a large volume of visits by potential customers. By obtaining an assessment of the potential customers' interests using a form displayed in the window prior to alerting a telemarketing agent of the presence of the potential customer at the WWW site, the use of the agent's time can be optimized in handling those potential customers with an interest in seeking further information.

Preferably, the window displayed by the telemarketing analysis server 38 on the PC 20 provides a menu of options which permits the potential customer to decline a personal contact; request a personal contact by telephone; request a personal contact by VoIP session; or, send an electronic mail message to a telemarketing agent. The telemarketing analysis server 38 preferably maintains a list of all agents and their call assignments. If such a list is maintained, the telemarketing analysis server 38 can personalize the message sent to the potential customer at PC 20 by inserting the name of the agent in the message sent. Thus a message may be sent such as the messages shown in FIGS. 6a, 6b, as will be explained below with reference to those figures.

In the example shown in FIG. 4, the potential customer using PC 20 responds to the telemarketing analysis server 38 that the potential customer desires a VoIP call from a telemarketing agent. As described above, the telemarketing analysis server 38 forwards an alert to a PC 36 of the telemarketing agent 32. The telemarketing agent may have been selected before the initial communication invitation was sent by the telemarketing analysis server 38 to the potential customer, as described above. On receipt of the alert, the telemarketing agent 32 responds by selecting a telephone line which alerts the PBX 49 of an off-hook condition of telephone 34. The PBX 49 responds after a few seconds delay, as described above, by calling a predefined warm-line number. The CTI server 40 which receives the call advises the telemarketing analysis server 38 that the call has been received. Telemarketing analysis server 38 responds by sending a message to PC 36 requesting that it retrieve information from an open warm-line application, as likewise described above with reference to FIG. 3.

The PC 36 retrieves the information and returns it in a message to the telemarketing analysis server 38. The telemarketing analysis server 38 examines the information and determines that a VoIP session is to be initiated with the current IP address of the PC 20. The telemarketing analysis server 38 therefore instructs the CTI server 40 to initiate the VoIP session with the PC 20. Using the VoIP gateway 42 (see FIG. 1), the CTI server 40 sets up the VoIP session with the PC 20. When the VoIP session is accepted by the potential customer at PC 20, the CTI server 40 advises the telemarketing analysis server 38 of the acceptance, and the telemarketing analysis server instructs the CTI server 40 to join the two calls. The VoIP gateway 42 handles conversion of voice transmission received on the telephone line from telephone 34 into IP packets transmitted to the PC 20, and the conversion of IP voice packets received from the PC 20 to voice transmission format, in a manner well known in the art. After the conversation is completed, the PC 20 may, for example, send a disconnect signal. On receipt of the disconnect signal, the CTI server 40 forwards a disconnect signal to the PBX 49 which in turn applies a dial tone to the line of the telemarketing agent's telephone 34. As explained above, it will be understood by those skilled in the art that the session may be terminated by the telemarketing agent rather than the potential customer.

Figure 5:
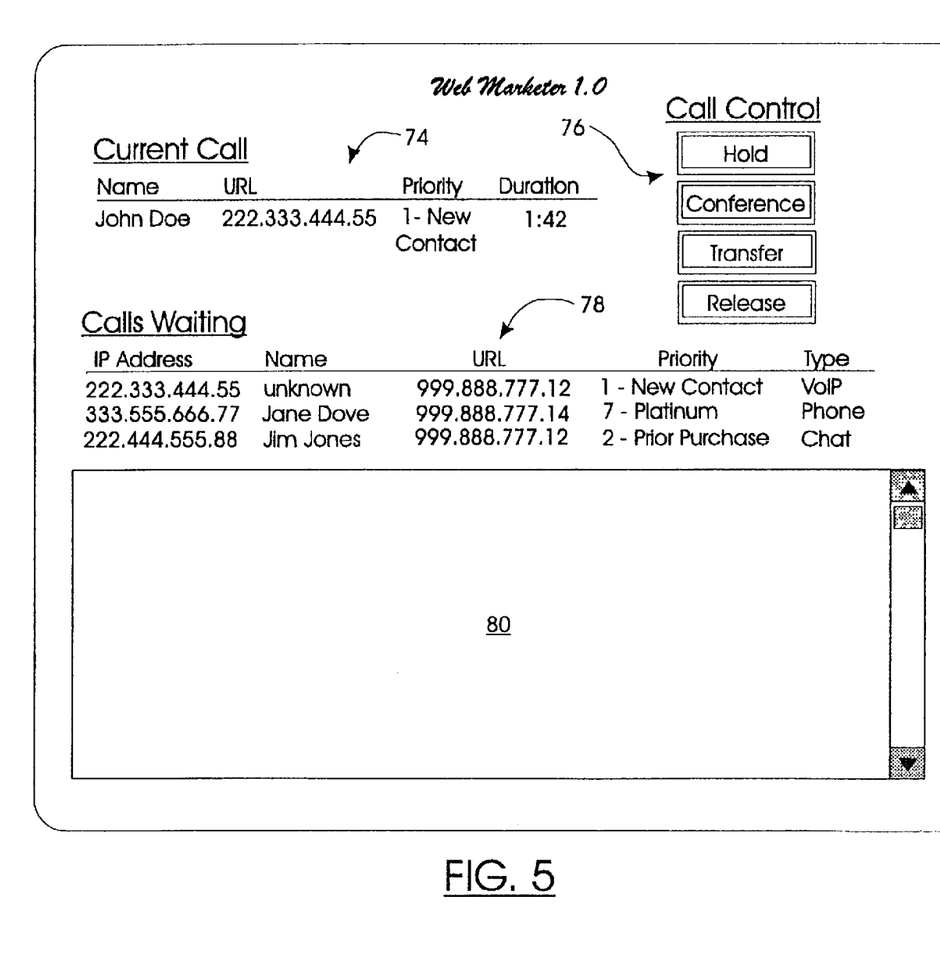
FIG. 5 is a schematic diagram of a display screen for a workstation of a telemarketing agent using a system like the one shown in FIG. 4.

Using an implementation of the invention as described above with relation to FIG. 4, it is practical and may be preferable to run a dedicated application 72 (see FIG. 2) on the PC 36 of the telemarketer 32, which permits communication requests to be queued and provides the agent with current call information as well as call control functions. FIG. 5 shows one example of a potential format for a screen display which may be used by the dedicated application running on the PC 36 of the telemarketing agent 32. A current call status area 74 preferably displays each of the following data items: name, URL, potential customer priority, and call duration.

Potential customer priority is derived from cookie data and is preferably maintained by the telemarketing analysis server 38 although a priority value may also be set by the telemarketing agent 32, assuming that the telemarketing administrator has given the telemarketing agent 32 the authority to set priority values. The telemarketing agent 32 may also change a priority value while the telemarketing agent 32 is communicating with the customer. Priority values may have a plurality of functions in call control and are valuable, for example, in alerting agents of potential customers with special status. The special status may, for example, relate to frequent buyers, preferred clients, new contacts, or nuisance callers. For example, nuisance callers may be assigned a priority value of 0. Using the embodiment described above with relation to FIG. 3, when the priority value of 0 is displayed, the telemarketing agent can ignore the visit of the potential customer and not send an invitation to initiate communication. Similarly, in the embodiment described with relation to FIG. 4, the telemarketing analysis server 38 can be programmed to suppress a communications invitation message to any potential customer having a priority value of 0. It will be understood by those skilled in the art that the priority value can provide a useful tool in many other aspects of telemarketing call control.

The priority values stored in cookies may be updated in several ways. For example, they may be updated by the telemarketing analysis server 38 in response to certain triggers. When a potential client makes a purchase, the purchase may trigger a priority value update. Likewise, a return visit to a web site may trigger an update of the priority value. It is also preferable that telemarketing agents be permitted to update potential customer priority values, or to assign at least certain values. For example, it may be desirable to permit a telemarketing agent to set a potential customer's priority value to indicate a nuisance caller, or the like. The management of potential customer priority values is a matter of design choice.

A dedicated application also provides call control options displayed in an area 76. Each control option is preferably initiated by a button in a manner well known in the art. Call control options permit a call to be put on hold; to be conferenced; to be transferred; or to be released, all in a manner well known in the art. Certain of the options such as conference and transfer force a display of windows requesting particulars (not illustrated) such as the number(s) to be conferenced, or an agent's number or extension where the call is to be transferred, etc.

The display also preferably includes a call waiting queue which displays all calls currently waiting for the agent. The call waiting queue preferably displays the following: IP address; name, if available; URL of the Web page which the caller was viewing when a communication request was received; a priority value which was described above; and a type of communication requested. As will be understood, the telemarketing agent 32 may accept the calls in the queue in any order. For example, the telemarketing agent may accept the call from Jane Dove having a priority value of 7 which indicates, for example, a "platinum" client over the new contact whose name is unknown. An area 80 of the dedicated application window permits the telemarketing agent to display the current page being viewed by the potential customer. Other areas may be displayed on the telemarketing window or may overlie another portion of the window. For example, a text chat window may be invoked if the potential customer requests a text chat with the telemarketing agent.

It will be understood by those skilled in the art that the layout of the dedicated application window displayed on PC 36 is a matter of design choice and that the layout and the contents of the window shown in FIG. 5 is for the purposes of illustration only.

Although calls processed in the example described in relation to FIGS. 4 and 5 were placed by the telemarketing agents, it should be understood that calls can be completed automatically if a telemarketing agent's queue is empty or is predicted to be empty about the time a call is to be completed. It should be further understood that a common call queue may be used and that a common controller may automatically place and distribute calls as agents are available or predicted to become available. Such call distribution methods and predictive algorithms are well known in the art and are not described here.

FIGS. 6a–6f illustrate six exemplary communications which may be used for an assistance invitation to initiate contact with a potential customer. While the pop-up windows shown in FIGS. 4a–4f use text messages, other forms of messaging may be used, such as recorded voice messages, or even live video if bandwidth and processing capacity permit. For the sake of these examples, it is assumed that text messages will be used. These text messages may be in the form of a library of messages from which agents select their favourites or most applicable messages. Messages could also be suggested on the basis of customer type or agent skill set. Messages may also be composed spontaneously in response to conditions communicated to the agent by the telemarketing analysis server 38.

Figure 6A:
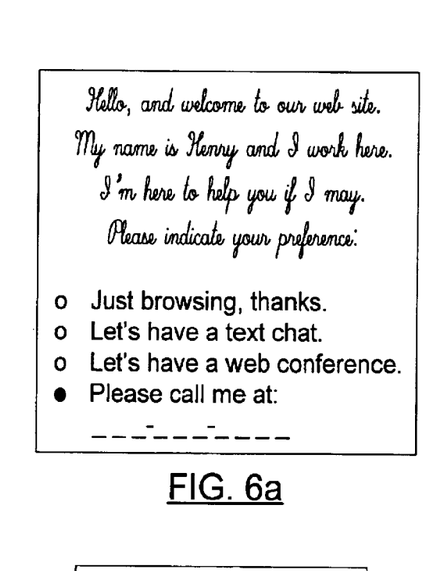
FIGS. 6a–6f are exemplary screen-pops which may be used for initially contacting potential customers using the system in accordance with the invention.
Figure 6B:
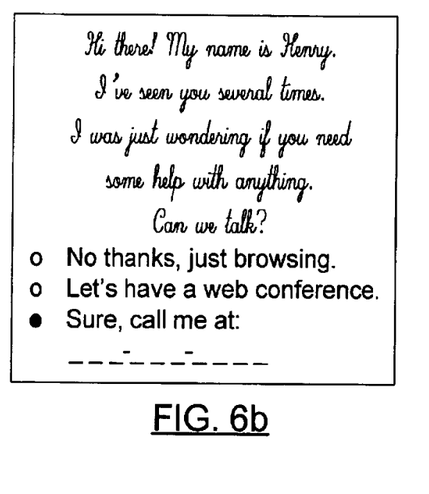
Figure 6C:
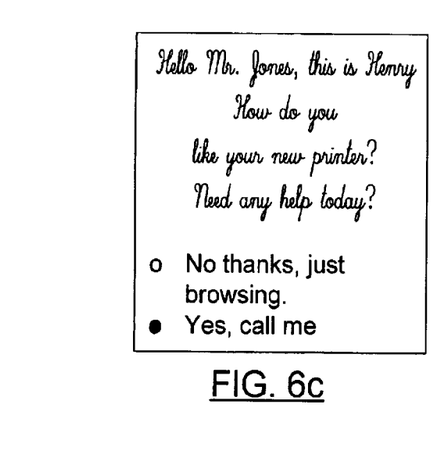
Figure 6D:
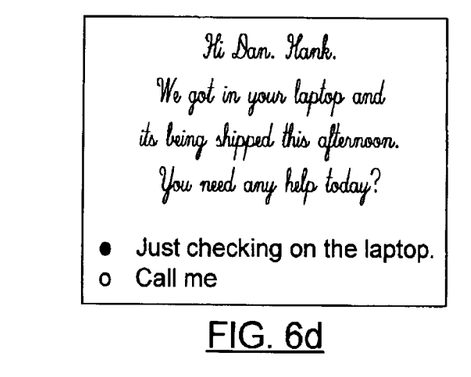

For example, FIGS. 6a and 6b show exemplary text messages which may be used to invite a potential customer for which little or no data exists to communicate with the agent. The potential customer is given an opportunity to turn down the invitation, request a text chat, request a web conference, or request a voice call by providing a telephone number. If the telephone number of the party is known, it may be defaulted into the input space provided. Radio buttons permit the potential customer to express their choice.

The application in accordance with the invention also permits telemarketing to be conducted in much the same way that sales agents conduct business in retail outlets, wherein telemarketers are employed by one or more vendors to be available full time. In that instance, the telemarketing agents will become familiar with customers in much the same way as sales agents become familiar with customers in retail outlets. In such circumstances, it is assumed that telemarketing agents will compose spontaneous messages when the presence of the potential customer is detected at the web site. Applying this invention to a more conventional telemarketing environment, it is also possible that the agent could pass on scripted messages or messages selected based on the agent skill set and customer information. It is assumed, of course, that repeat customers will accept cookies and such information as their telephone number and their name will be known to the telemarketing agent, and these examples reflect that.

Figure 6E:
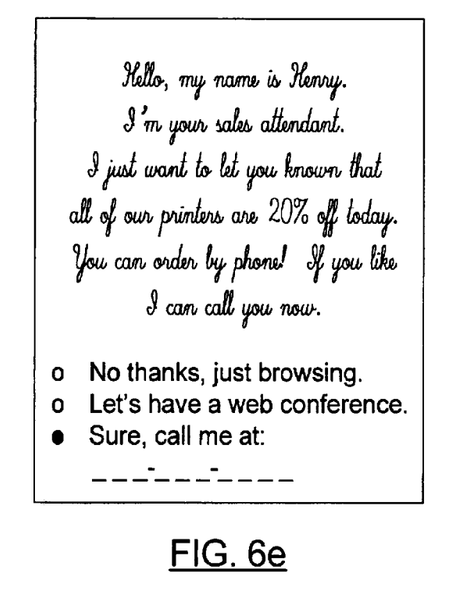

Customer draw may be enhanced by special messages applicable to specific marketing ploys such as specials on merchandise. FIG. 6e shows an example of such an assistance invitation.

Figure 6F:
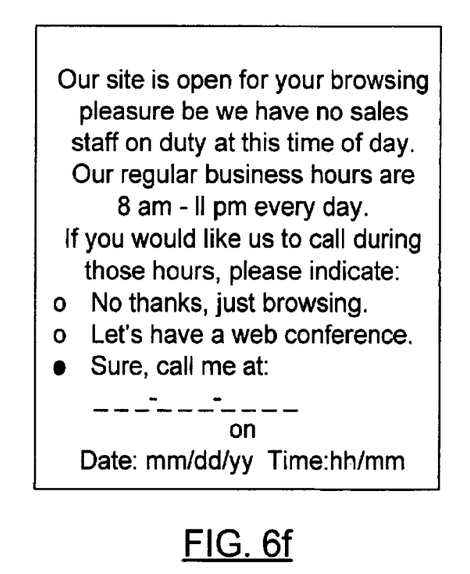

It will also be understood by those skilled in the art that the system in accordance with the invention may be used to automatically collect contacts at times when telemarketing agents are not on duty or all agents are occupied. The telemarketing analysis server 38 can be programmed to send pop-up window applets to potential customers when no agents are available. The telemarketing analysis server 38 maintains a table of available agents as well as their state of occupation. If no agents are available or all agents are busy, the telemarketing analysis server 38 may be enabled to send one of a plurality of messages depending on the circumstances. FIG. 6f is one example of a message which may be used during off-hours. Any responses are stored in a job file for agents to attend to when they are on duty. A similar message may announce that all sales agents are currently occupied but someone can contact the potential customer as soon as an agent becomes available. Responses in the job file may be prioritized in accordance with any predefined criteria. The response form presented to potential customers may also ask questions which would permit entries in the job file to be prioritized in one or more ways.

Figure 7:
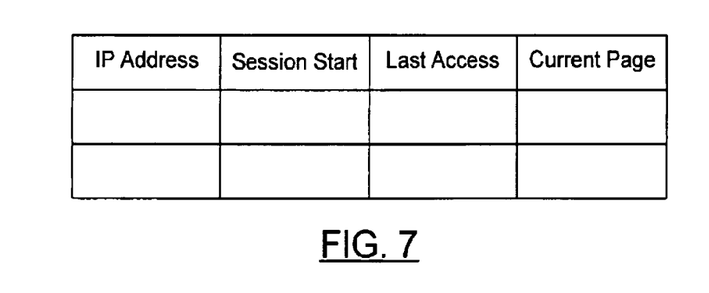
FIG. 7 is a diagram of a table which may be used for monitoring the session activity of potential customers who refuse cookies.

It is known that a certain percentage of web browsers will refuse cookies. Behavioural history relating to the potential customer will therefore not be available to the public servers 45, 47. In these instances, it is possible to at least track session information. This may be done in one of two ways. Certain browsers support single session cookies which makes session information available to the public server 45 (see FIG. 3). It is also possible to program the monitoring function 58 on the public server 45 to store session information in an instance where the potential customer refuses cookies and the potential customer's browser does not support session cookies. An example of such a table is illustrated in FIG. 7. Using the table shown in FIG. 7, it is possible to determine how much time a potential customer has spent at the public server 45 and to track the pages being currently viewed. Business decisions respecting when contact becomes worthwhile may then be made and criteria set to reflect those decisions so that an alert message is sent to a telemarketing agent when a customer's behaviour is deemed to indicate an interest in the products or services advertised or promoted by the public server 45, 47.

It will be well understood by those skilled in the art that the table shown in FIG. 7 must be regularly maintained in order to limit the number of records it contains. The table is therefore periodically scanned and records are deleted when, for example, more than five minutes have elapsed since a potential customer last accessed to the public server 45, 47. The criteria for deleting records from the potential customer activity table is, of course, programmable and will depend on the needs and experience of the operators of a particular public server.

The invention therefore provides a flexible system which permits a novel approach to telemarketing. The system enables a personal presence at a web site in much the same way that a personal presence may be maintained in a retail outlet. The innovative applications of the methods and system in accordance with the invention are limited only by the imagination and skill of users. For example, the system and methods in accordance with the invention may be used for personnel support in a corporate environment. As such, a help server could be monitored to alert support personnel when an employee has spent a predetermined amount of time in a help function. The alert would direct support personnel directly to the individual requiring assistance. Many other applications of the methods and system are also known to be useful and practical.

It will be understood by those skilled in the art that the method in accordance with the invention may be implemented using a system other than the one described above. For example, the Telephony Application Programming Interface (TAPI) is a public domain protocol allowing computers to communicate with switching equipment in a switched telephone network to complete calls using the methods in accordance with the invention. A private domain tool such as Nortel's Compucall® may also be used to implement the invention in a switched telephone network such as the PSTN.

Although the method and system described above have been described with reference to the WWW only, it should be understood that customer activities such as file transfer protocol (ftp), for example, may be tracked and also serve as a basis for telemarketing agent alerts.

The embodiments of the invention described above are intended to be exemplary only. The scope of the invention is therefore intended to be limited solely by the scope of the appended claims.

We claim:

1. A method of alerting a telemarketing agent of a promotion opportunity in response to activity of a potential customer browsing a public server, comprising steps of:

monitoring the public server using software, which is active on the public server, to determine if past or present browsing activity of the potential customer satisfies a predefined criteria, and examining information associated with the potential customer; and sending a message to the telemarketing agent, the message being generated by the software active on the public server, to advise the telemarketing agent of the promotion opportunity without any action by the potential customer to initiate communication with the telemarketing agent if the browsing activity of the potential customer or the information satisfies the predefined criteria, the message including means for identifying the potential customer to permit the telemarketing agent to dispatch an assistance invitation that is displayed to the potential customer to invite the potential customer to request communication with the telemarketing agent.

2. A method as claimed in claim 1 wherein the public server is monitored by software which is active on the public server, and the software forwards information to a telemarketing analysis server for analysis, the telemarketing analysis server sending the message to the telemarketing agent when the information satisfies the predefined criteria.

3. A method as claimed in claim 1 further comprising a step of inserting in the message an IP address of the potential customer and a URL of a page on the public server where the potential customer is active.

4. A method as claimed in claim 3 further comprising a step of inserting in the message a priority value associated with the potential customer, the priority value being inserted in the message before the message is sent.

5. A method as claimed in claim 3 further comprising a step of inserting in the message other information known about the potential customer, such as frequent purchases or past behaviour.

6. A method as claimed in claim 1 further comprising a step of including in the assistance invitation sent to the customer a form inviting communication, and the assistance invitation displays a menu of options from which the potential customer may select a preferred type of communication with the telemarketing agent.

7. A method as claimed in claim 2 wherein on receipt of the message the telemarketing agent sends the assistance invitation to the potential customer inviting communication and the assistance invitation displays a menu of options from which the potential customer may select a preferred type of communication with the telemarketing agent.

8. A method as claimed in claim 7 wherein the options include opening a text chat window in order to enable communications between the telemarketing agent and the potential customer.

9. A method as claimed in claim 7 wherein the options include establishing a voice connection in order to enable communications between the telemarketing agent and the potential customer.

10. A method as claimed in claim 9 wherein on selecting the option of establishing a voice connection with the telemarketing agent, a request for establishing the voice connection is examined for a phone number or an IP address of the potential customer.

11. A method as claimed in claim 7 wherein the assistance invitation displays a menu of options that permits the potential customer to enter a telephone number, request a VoIP session or a text chat session with the telemarketing agent, send an electronic mail message to the telemarketing agent, or reject a communications session with the telemarketing agent.

12. A method as claimed in claim 1 wherein the step of monitoring comprises maintaining a session activity table for potential customers who refuse cookies, records in the activity table including potential customer identification and session related data.

13. A method as claimed in claim 12 wherein the activity table is periodically scanned to determine whether any record in the table satisfies the predefined criteria, and the message is sent to the telemarketing agent if a record in the activity table satisfies the predefined criteria.

14. A method as claimed in claim 13 wherein the predefined criteria comprises an indication that the potential customer has accessed the public server for a period of time that exceeds a predefined threshold.

15. A method as claimed in claim 13 wherein the predefined criteria comprises an indication that the potential customer has accessed a specific page on the public server.

16. A method as claimed in claim 12 wherein the activity table is periodically scanned to determine whether any record satisfies a predefined criteria, and a record is deleted from the activity table if the record satisfies the predefined criteria.

17. A method as claimed in claim 16 wherein the predefined criteria is an indication that a predefined period of time has elapsed since the potential customer identified by the record in the activity table last accessed the public server.

18. A system for alerting a telemarketing agent of a promotion opportunity in response to activity of a potential customer browsing a public server, comprising:
   means for monitoring the activities of potential customers visiting at least one public server to access information;
   means for sending a message to the telemarketing agent, the message being generated by software active on the public server, to advise the telemarketing agent of the promotion opportunity, without any action by the potential customer to initiate communication with the telemarketing agent, if the browsing activities of the potential customer or information collected about the potential customer satisfies a predefined criteria, the message including means for identifying the potential customer to permit the telemarketing agent to dispatch an assistance invitation that is displayed to the potential customer to invite the potential customer to request communication with the telemarketing agent;
   means for permitting the telemarketing agent to dispatch the assistance invitation to the potential customer, the assistance invitation displaying a menu of options for permitting the potential customer to indicate a preference respecting communications with the telemarketing agent; and
   means for forwarding a message containing the preference selected by the potential customer from the menu of options to the telemarketing agent when the preference selected indicates that communications with the telemarketing agent are desired.

19. A system as claimed in claim 18 wherein the system forwards the message containing the preference selected by the potential customer from the menu of options to the telemarketing agent and stores the message in a call waiting queue on the telemarketing agent's workstation.

20. A system as claimed in claim 18 wherein the system inserts an 1P address of the potential customer and a URL of a page on the public server that the potential customer was viewing when the message forwarded to the telemarketing agent.

21. A system as claimed in claim 20 wherein the system further inserts a priority value associated with the potential customer into the message, the priority value being inserted before the message is sent to the telemarketing agent.

22. A system as claimed in claim 19 wherein the system permits the telemarketing agent to selectively service any call waiting in the queue.

23. A method of alerting a telemarketing agent of a promotion opportunity in response to a potential customer browsing a public server comprising:
   monitoring the public server to determine if past or present activity of the potential customer satisfies a predefined criteria;
   sending a message to the telemarketing agent, the message being generated by software active on the public server to advise the telemarketing agent of the promotion opportunity without any action by the potential customer to initiate communication with the telemarketing agent if the browsing activities of the potential customer or information collected about the potential customer satisfies a predefined criteria, the message including means for identifying the potential customer to permit the telemarketing agent to dispatch an assistance invitation that is displayed to the potential customer to invite the potential customer to request communication with the telemarketing agent;
   alerting the telemarketing agent to dispatch the assistance invitation to the potential customer on receipt of the message, to permit the potential customer to select a preference from the menu of options respecting communications with the telemarketing agent; and
   advising the telemarketing agent when the potential customer selects an option indicating a preference to communicate with the telemarketing agent.

24. A method as claimed in claim 23 wherein the step of advising comprises placing information about the potential customer in a queue displayed to the telemarketing agent.

25. A method as claimed in claim 24 wherein the information placed in the queue includes a priority value associated with the potential customer.

26. A method as claimed claim 25 wherein the priority value is stored in a cookie associated with the potential customer.

27. A method as claimed in claim 26 wherein the priority value may be updated or changed.

28. A method as claimed in claim 27 wherein the priority value may be changed by the telemarketing agent while the telemarketing agent is communication with the potential customer.

29. A method as claimed in claim 27 wherein the priority value is automatically changed by the public server if the potential customer's activity satisfies a certain predefined criteria.

30. A method as claimed in claim 7 wherein the assistance invitation dispatched to the potential customer is a multimedia message.

31. A method as claimed in claim 7 wherein the assistance invitation dispatched to the potential customer is a video recording.

32. A system as claimed in claim 18 wherein the assistance invitation dispatched to the potential customer is a multimedia message.

33. A system as claimed in claim 18 wherein the assistance invitation dispatched to the potential customer is a video recording.

34. A method as claimed in claim 23 wherein the assistance invitation dispatched to the potential customer is a multimedia message.

35. A method as claimed in claim 23 wherein the assistance invitation dispatched to the potential customer is a video recording.

36. A method as claimed in claim 9 wherein if the potential customer selects an option indicating a preference to communicate with the telemarketing agent, a call connection is automatically made between the telemarketing agent and the potential customer.

37. A system as claimed in claim 18 wherein if the potential customer selects an option indicating a preference to communicate with the telemarketing agent, the system automatically establishes a call connection between the telemarketing agent and the potential customer.

38. A method as claimed in claim 23 wherein if the potential customer selects an option indicating a preference to communicate with the telemarketing agent, a call connection is automatically established between the telemarketing agent and the potential customer.

* * * * *